United States Patent [19]

Strom

[11] Patent Number: 5,531,366
[45] Date of Patent: Jul. 2, 1996

[54] CARRY OUT CADDY FOR SHOPPING CARTS

[76] Inventor: Grant C. Strom, 11 Cobbler Ct., South Elgin, Ill. 60177

[21] Appl. No.: 278,758

[22] Filed: Jul. 22, 1994

[51] Int. Cl.⁶ ........................................... A45F 3/04
[52] U.S. Cl. ................... 224/153; 224/411; 224/320; 224/322; 224/585; 224/586; 333/15; 333/22
[58] Field of Search ................... 224/151, 153, 224/42.01, 311, 314, 318, 320, 309, 319, 322, 328, 411, 563, 558, 925, 227, 228, 404; 280/33.992; 383/15, 22, 11, 12

[56] References Cited

U.S. PATENT DOCUMENTS

| | | | |
|---|---|---|---|
| 2,457,422 | 12/1948 | Warner | 383/15 |
| 2,712,336 | 7/1955 | Casselman | 383/15 |
| 2,933,225 | 4/1960 | Fry et al. | 224/563 |
| 3,768,643 | 10/1973 | Bruno. | |
| 4,125,220 | 11/1978 | Suominen. | |
| 4,186,859 | 2/1980 | Frankfort et al. | 224/151 |
| 4,305,519 | 12/1981 | Gerich | 224/925 |
| 4,466,124 | 8/1984 | Kirkham, Jr. | 224/153 |
| 4,466,659 | 8/1984 | Carpentier et al. | 224/318 |
| 4,560,096 | 12/1985 | Lucas et al. . | |
| 4,592,091 | 5/1986 | Italici | 383/15 |
| 4,596,397 | 6/1986 | Conti. | |
| 4,604,765 | 8/1986 | Schultz | 224/153 |
| 4,856,570 | 8/1989 | Rushing et al. | 224/153 |
| 4,871,100 | 10/1989 | Posner. | |
| 4,890,934 | 1/1990 | Feaver et al. . | |
| 4,961,522 | 10/1990 | Weber | 224/151 |
| 5,009,516 | 4/1991 | Geock. | |
| 5,044,699 | 9/1991 | Duty. | |
| 5,046,860 | 9/1991 | Brennan. | |
| 5,203,578 | 4/1993 | Davidson et al. . | |
| 5,209,385 | 5/1993 | Ledesma. | |
| 5,271,634 | 12/1993 | Walton | 280/33.992 |
| 5,289,958 | 3/1994 | Jay | 224/153 |
| 5,340,004 | 8/1994 | Moore | 224/404 |
| 5,366,124 | 11/1994 | Dearborn, IV | 224/404 |
| 5,368,210 | 11/1994 | Wotring | 224/318 |

FOREIGN PATENT DOCUMENTS

176067  4/1986  European Pat. Off. ............... 224/153

Primary Examiner—Henry J. Recla
Assistant Examiner—Charles R. Eloshway
Attorney, Agent, or Firm—Charles F. Meroni, Jr.

[57] ABSTRACT

A reusable shopping bag assembly is provided. The assembly has collapsible expandable soft sided bags which can be rolled up from an upper open end in a spiral shape, the bags having a bottom end having a plurality of holes to permit air flow there through for allowing the bags to be rolled up into a compact shape. A pair of hanger bars are attached to opposite bag sides adjacent the upper open end of the bags. Opposite ends of each hanger bar extending beyond opposite bags sides for engagement with spaced apart upper edges of a shopping cart to suspend the bags in a shopping cart when the bags are unrolled. A carrying case is provided having a side opening. The side opening being adapted for insertion of the bags when the bags are in a rolled state so that the carrying case will encapsulate the bags.

26 Claims, 5 Drawing Sheets

CARRY OUT CADDY FOR SHOPPING CARTS

BACKGROUND OF THE INVENTION

1. Field of the Invention

The present invention relates generally to shopping bags. More particularly, the invention pertains to reusable shopping bags and shopping bag assemblies for use with shopping carts.

2. Description of the Prior Art

Many different types of reusable shopping bags and shopping bag assemblies are known in the art. A large part of this can be attributed to environmental concerns. Disposable paper or plastic bags, which are commonly used by stores, suffer from a number of environmental disadvantages. The use of plastic bags poses problems because plastic is not biodegradable and the amount of landfill space is decreasing. While paper bags are biodegradable, great emphasis is being placed on the conservation of forests and wood products. Accordingly, the use of a reusable shopping bag is extremely advantageous in that it does not create an excessive demand on resources and outwardly displays an individuals environmental concern.

U.S. Pat. No. 5,046,860, issued to Brennan, discloses a reusable shopping bag assembly. A primary bag includes a plurality of compartments for storing auxiliary bags, which can be removed as necessary to store and carry items. While the Brennan assembly does provide a satisfactory means for holding a number of bags, the assembly suffers from a number of disadvantages. Items can not be easily loaded into the bags when the bags are placed in a shopping cart. The bags will not attach to the cart nor can they be placed empty into the cart and remain in an open position. Furthermore, the Brennan assembly does not provide for a manner of closing the bags when transporting them.

U.S. Pat. No. 5,209,385 issued to Ledesma, discloses a reusable shopping bag kit. Similar to the Brennan assembly, the Ledesma kit includes a plurality of shopping bags which are folded and rolled up and placed into a carrying case. This device also does not provide a means for attaching the bags to the cart or for closing the bags when transporting them.

U.S. Pat. No. 4,560,096, issued to Lucas et al., and U.S. Pat. No. 4,871,100, issued to Posner, disclose reusable shopping bags which are adapted to attach to a shopping cart to receive a load. However, these devices do not provide for a compact portable design as the devices above, and suffer from a number of other disadvantages. For instance, the devices do not provide a means for either securely closing the bag opening when transporting the bags or for adjusting the securement of the bag to the cart without reducing the size of the bag opening, when using carts of larger design.

A more desirable reusable shopping bag is one which would be easily stored and transported, while providing the ability to secure to shopping carts of varied sizes. An additional desirable feature, which is not shown in the prior art, is one which would provide a means for easily transporting loaded shopping bags without an individual having to carry the loaded bags with his or her arms. As will be described in greater detail hereinafter, the reusable shopping bag and assembly of the present invention differs from those previously proposed.

SUMMARY OF THE INVENTION

Accordingly, it is an object of this invention to provide a strong lightweight reusable shopping bag for use with shopping carts of varied sizes.

Another object of this invention is to provide a carrying case which will hold shopping bags and can attach to a shopping cart.

Still another object of this invention is to provide a carrying case which will provide a manner of carrying loaded shopping bags without the use of an individual's arms.

To achieve the foregoing and other objectives, and in accordance with the purposes of the present invention a reusable shopping bag is provided. The reusable shopping bag comprises a collapsible expandable soft sided bag which can be rolled up from an upper open end in a spiral shape. The collapsible expandable soft sided bag structure has a bottom end having a plurality of holes to permit air flow there through for allowing the collapsible expandable soft sided bag to be rolled up into a compact shape.

A pair of hanger bars are provided. The hanger bars are attached to opposite collapsible expandable soft sided bag sides adjacent the upper open end of the collapsible expandable soft sided bag. Opposite ends of each hanger bar extend beyond opposite collapsible expandable soft sided bag sides of the collapsible expandable soft sided bag for engagement with spaced apart upper edges of a shopping cart to suspend the collapsible expandable soft sided bag in a shopping cart when the collapsible expandable soft sided bag is unrolled and expanded.

In accordance with an aspect of the invention, a hook and loop type fastening strap is connected to one hanger bar for detachably securing to a mated hook and loop type fastening strap connected to the other hanger bar for closing the upper open end of the bag. Alternatively, a latch assembly connected to the hanger bars can be used.

In accordance with another aspect of the invention, the hanger bars are telescoping and utilize an elastic cord attached within to provide adjustable securing of the opposite ends of each hanger bar for engagement with the spaced apart upper edges of the shopping cart.

In accordance with another aspect of the invention, a carrying case, quiver or backpack type bag is provided having a side opening. The side opening is adapted for insertion of the collapsible expandable soft sided bag when the collapsible expandable soft sided bag is in a rolled state so that the quiver will encapsulate the collapsible expandable soft sided bag. A carrying strap or, alternatively, a pair of shoulder straps are attached to the quiver or backpack type bag. When utilizing the shoulder straps, loaded bags can be attached to the backpack type bag to provide a manner of transporting the loaded bags without the use of an individual's arms. This allows the individual greater flexibility and transportation possibilities, such as transporting the loaded bags by bicycle.

In accordance with yet another aspect of the invention, a side pouch is attached to the quiver or backpack type bag to provide a compartment that is suitable for holding keys, coupons, grocery lists, money, or other items.

Other objects, features and advantages of the invention will become more readily apparent upon reference to the following description when taken in conjunction with the accompanying drawings, which drawings illustrate several embodiments of the invention.

DETAILED DESCRIPTION OF THE PREFERRED EMBODIMENT

Figure 1:
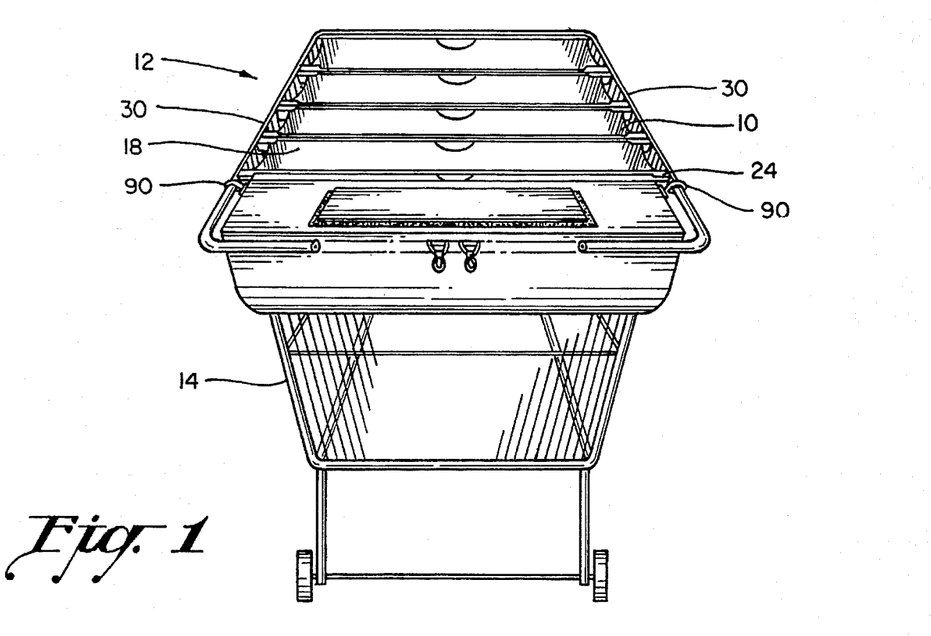
FIG. 1 is a perspective view the reusable shopping bag assembly in use with a shopping cart.

Referring now to the drawings, FIG. 1 shows my new and improved reusable shopping bag 10 and assembly 12 in use within a shopping cart 14.

Figure 2:
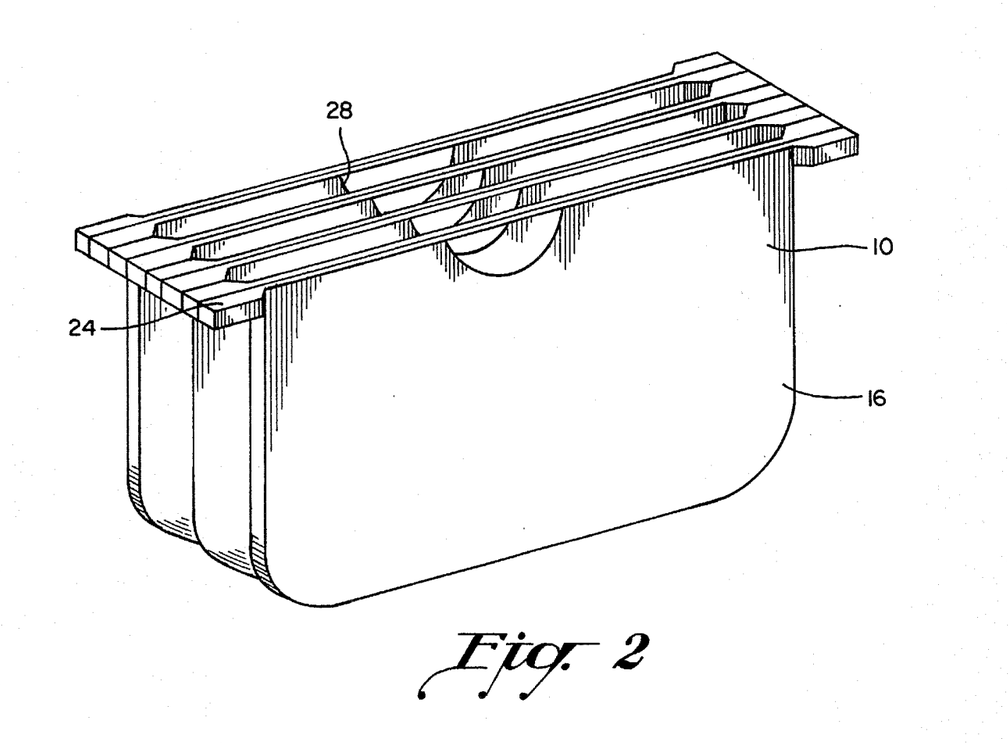
FIG. 2 is a perspective view of collapsible expandable soft sided bags in an unrolled state.
Figure 3:
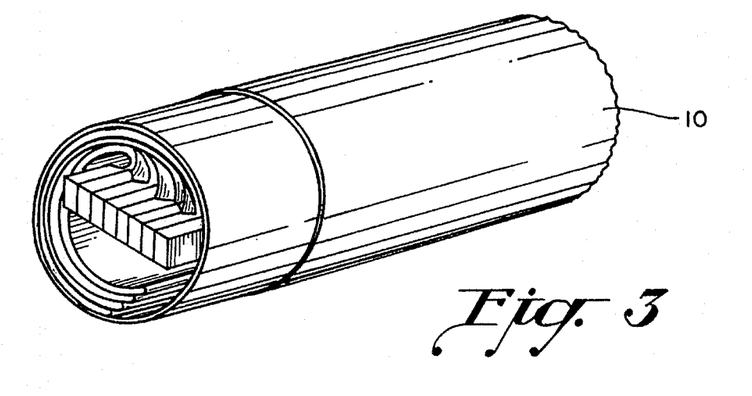
FIG. 3 is a perspective view of the collapsible expandable soft sided bags in a rolled state.

As illustrated in FIG. 2, the reusable shopping bag 10 comprises a collapsible expandable soft sided bag 16. The collapsible and expandable soft sided bag structure 16 is comprised of a soft woven fabric, such as nylon, and can be rolled up from an upper open end 18 in a spiral shape, as shown in FIG. 3. The collapsible expandable soft sided bag 16 has a bottom end 20 having a plurality of holes 22 to permit air flow there through for allowing the collapsible expandable soft sided bag 16 to be rolled up into a compact shape. Alternatively, the material comprising the collapsible expandable soft sided bag 16 may also be porous in nature so that the holes 22 are inherently built into the bag 16.

A pair of hanger bars 24 are provided. The collapsible expandable soft sided bag 16 has hanger bars means for attaching the hanger bars 24 to opposite collapsible expandable soft sided bag sides 26 adjacent the upper open end 18 of the collapsible expandable soft sided bag 16. Preferably, the hanger bar means consists of directly attaching the hanger bars 24 to the bag sides 26 by any suitable means. In one embodiment, the bag sides 26 provide sleeves of conventional design to allow the hanger bars 24 to be inserted through. In this embodiment, the bags 16 can easily be removed from the hanger bars 24 to be placed into a washing machine for cleaning. Thereafter, the hanger bars 24 can be reinserted into the sleeves to place the bag 16 into operating condition.

Figure 4:
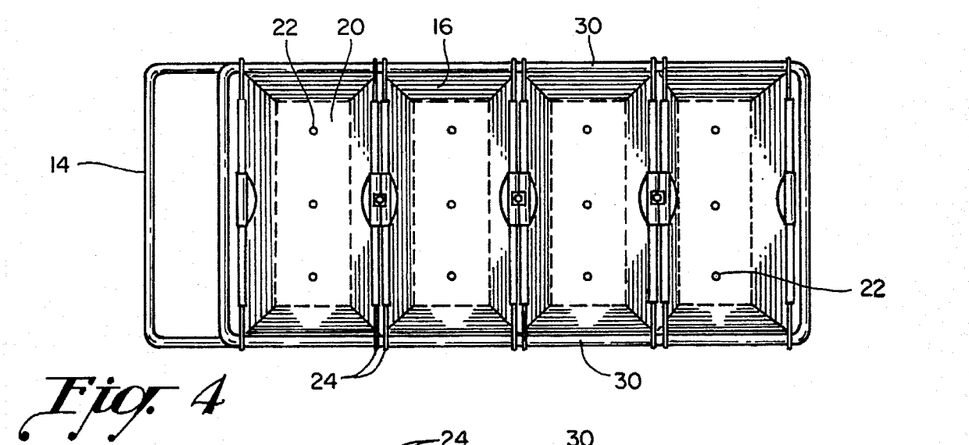
FIG. 4 is a top view of the collapsible expandable soft sided bags suspended in a shopping cart.
Figure 5:
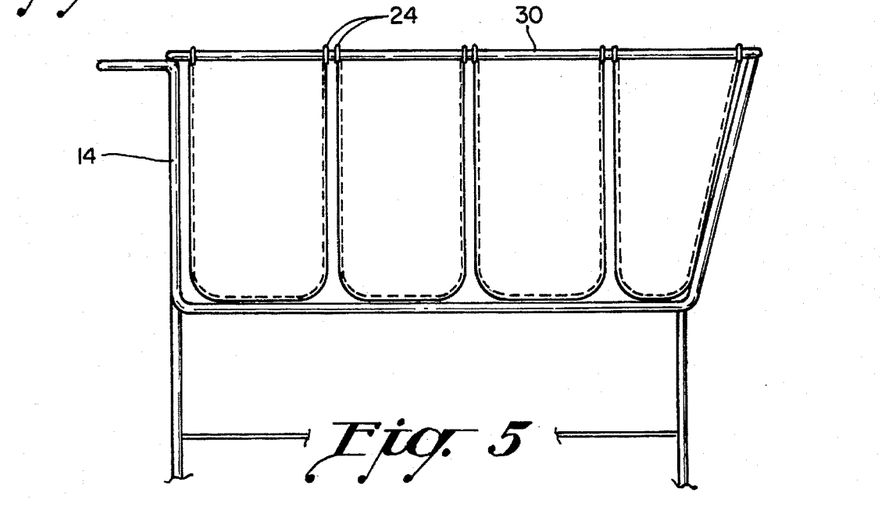
FIG. 5 is a side view of the collapsible expandable soft sided bags suspended in a shopping cart.

Referring to FIG. 2, one embodiment provides a semicircular cutout 28 in combination with the hanger bars 24 to create a handle enabling a person to grasp both sides of the bag 16 through the use of the handles to hold the bag 16 in a secure position when moving the bag 16 from one position to another. Opposite ends of each hanger bar extend beyond opposite collapsible expandable soft sided bag sides 26 of the collapsible expandable soft sided bag 16 for perpendicular engagement with spaced apart upper edges 30 of the shopping cart 14 to suspend the collapsible expandable soft sided bag 16 in a shopping cart 14 when the collapsible expandable soft sided bag 16 is unrolled and expanded for hanging in a shopping cart 14, as illustrated in FIGS. 4 and 5.

Figure 6:
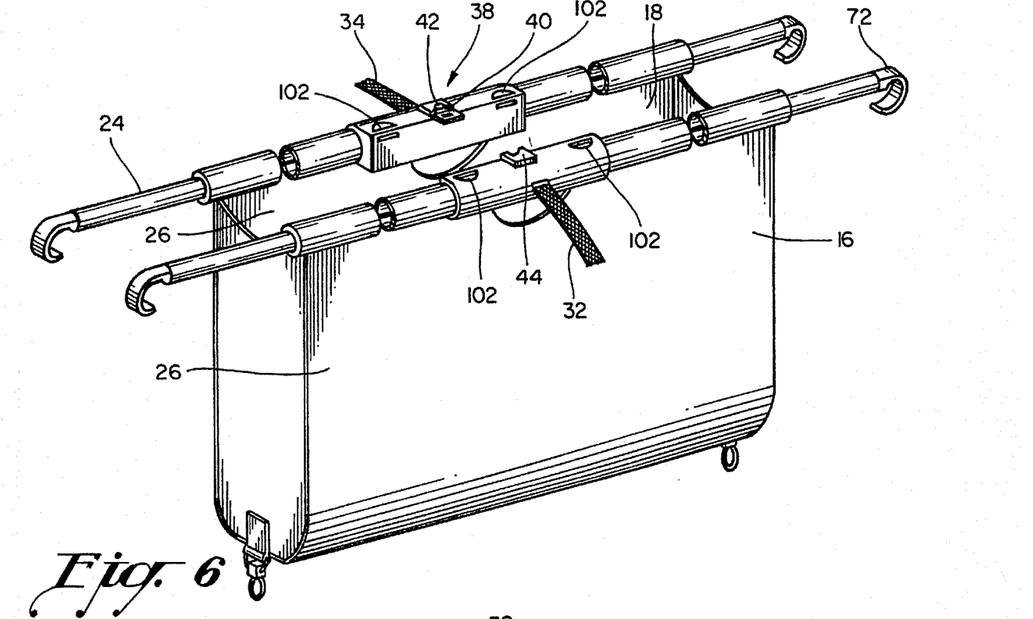
FIG. 6 is perspective view showing alternative embodiments of the collapsible expandable soft sided bag.

Referring now to FIG. 6, the hanger bars 24 are configured to secure to one another. In one embodiment, a hook and loop type fastening strap 32, such as VELCRO, is connected to one hanger bar 24 for detachably securing to a mated hook and loop type fastening strap 34 connected to the other hanger bar 24. In an alternative embodiment also illustrated by FIG. 6 as well as FIG. 7, a latch assembly 38 of conventional design is operatively connected to the hanger bars 24. The latch assembly 38 comprises a latch member 40 having a release button 42. The latch member 40 is adapted for latching securement into receiving member 44. It is to be understood, however, that other latching and securing assemblies could equally be used.

Figure 8:
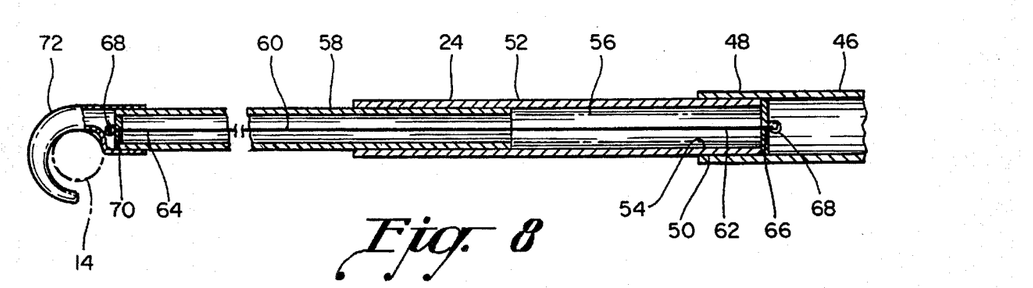
FIG. 8 is a fragmentary cross-sectional view of a hanger bar.

Referring now to FIG. 8, the hanger bars 24 are connected in a telescoping fashion to provide adjustable securement for engagement with the spaced apart upper edges 30 of the shopping cart 14 to provide varied length of the hanger bar for extending between the upper edges of shopping carts having varied widths between the spaced apart upper edges. The hanger bars 24 are preferably formed from fiberglass or molded synthetic plastic.

In a preferred embodiment, a hanger bar handle portion 46 has a end portion 48 having a handle portion inner surface 50. A hanger bar center portion 52 has a center portion first end 54 engaging the handle portion inner surface 50. The handle portion inner surface 50 may be secured to the center portion first end 54 with adhesive, or alternatively both members could be formed integrally therewith. Alternatively, the handle portion inner surface 50 and the center portion first end 54 may threaded for detachable threaded engagement. The hanger bar center portion 52 has a center portion inner surface 56 for slideable engagement with a hanger bar end portion 58. An elastic cord 60 having a first cord end 62 and a second cord end 64 is secured to the center portion first end 54 by inserting the first cord end 62 through a center portion aperture 66 of the center portion first end 54 and ending in a clip or knot 68. The second cord end 64 is secured to the hanger bar end portion 58 by being inserted through a end portion aperture 70 of the hanger bar end portion 58 and ending in a clip or knot 68, so that opposite ends are urged inwardly towards the center portion of the hanger bar, as shown in FIGS. 6 and 8. The other end of the hanger bar 24 is similarly constructed. The hanger bars 24 each have hooks 72 at opposite ends to suspend the bag 16 on the cart 14.

Figure 9:
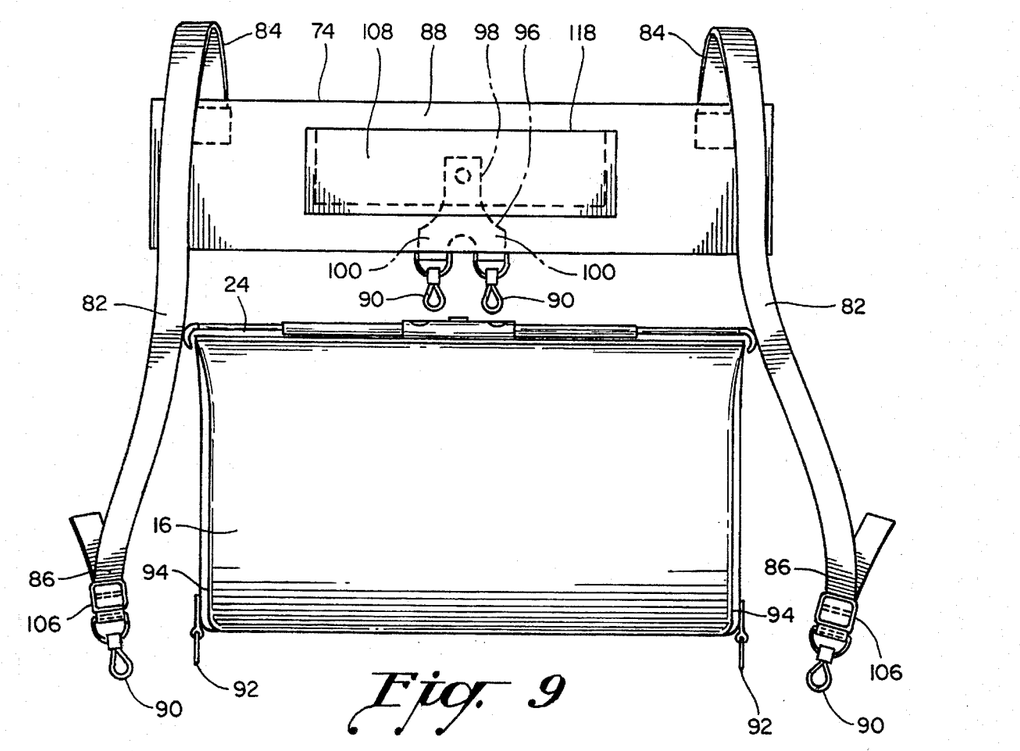
FIG. 9 is an exploded perspective view of the reusable shopping bag assembly for use in carrying a loaded collapsible expandable soft sided bag.

Referring now to FIG. 9, a quiver or backpack type bag 74 is shown. The quiver or backpack type bag 74 has a side opening 76, the side opening 76 being adapted for insertion of the collapsible expandable soft sided bag 16 when the collapsible expandable soft sided bag 16 is in a rolled state so that the quiver or backpack type bag 74 will encapsulate the collapsible expandable soft sided bag 16. Preferably, the side opening 76 had an attached drawstring 78 and drawstring cord lock 80 for cinching the side opening 76 closed.

The quiver or backpack type bag 74 can be configured in a number of different ways depending on the placement and style of straps. In a backpack style embodiment, shown in FIG. 9, a pair of shoulder straps 82 each have a first end 84 and a second end 86. The backpack type bag 74 can be formed of a nylon, cotton, or synthetic plastic material. However, a back side 88 of the backpack type bag 74 is preferably formed of or reinforced with ABS Nylon. This provides a stiff and strengthened structure to the backpack type bag 74.

The first end 84 of each shoulder strap 82 is then attached or sewn to the back side 88 of the backpack type bag 74 at opposite ends. The second end 86 of each shoulder strap 82 has a clasp 90, of conventional design, attached thereto. The clasp 90 clips to a clasp receiving member 92 attached on two lower bag ends 94 of the bag 16 for detachably securing each shoulder strap 82 to the bag 16, when the bag 16 is in a loaded unrolled state.

Additionally, each shoulder strap 82 may have a strap adjustment clip 106 for adjusting the length of each shoulder strap 82. The strap adjustment clip 106 is of conventional design and is known to one skilled in the art.

When the backpack type bag 74 is placed in cart 14, as shown in FIG. 1, the clasp 90 on the second end 86 of each shoulder strap 82 can be used to secure the backpack type bag 74 directly to the cart 14. This securement adds additional security to prevent a thief from easily grabbing the backpack type bag 74 when the owner is looking away.

Referring back to FIG. 9, a center reinforcement member 96 has an upper member portion 98 and two lower member portions 100. The upper member portion 98 is attached or sewn to the back side 88 of the backpack type bag 74 at equal distances from either first end 84 of each shoulder strap 82. In addition, the member 96 is positioned so that the two lower member portions 100 extend perpendicularly away from the back side 88.

Figure 7:
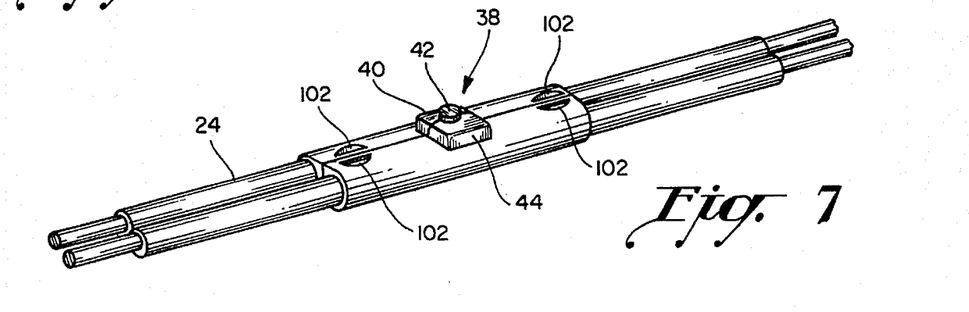
FIG. 7 is a fragmentary perspective view of the hanger bars.

A clasp 90 is attached to each lower member portion 100. Each clasp 90 of each lower member portion 100 is inserted through and engages hanger bar apertures 102 located on each hanger bar 24, as shown in FIGS. 6 and 7. The clasp 90 will be inserted into a hanger bar aperture 102 of one hanger bar 24 and will come out through the hanger bar aperture 102 of the other hanger bar 24. Therefore, the collapsible expandable soft sided bag 16 can be suspended from and adjacent to the backpack type bag 74.

Figure 11:
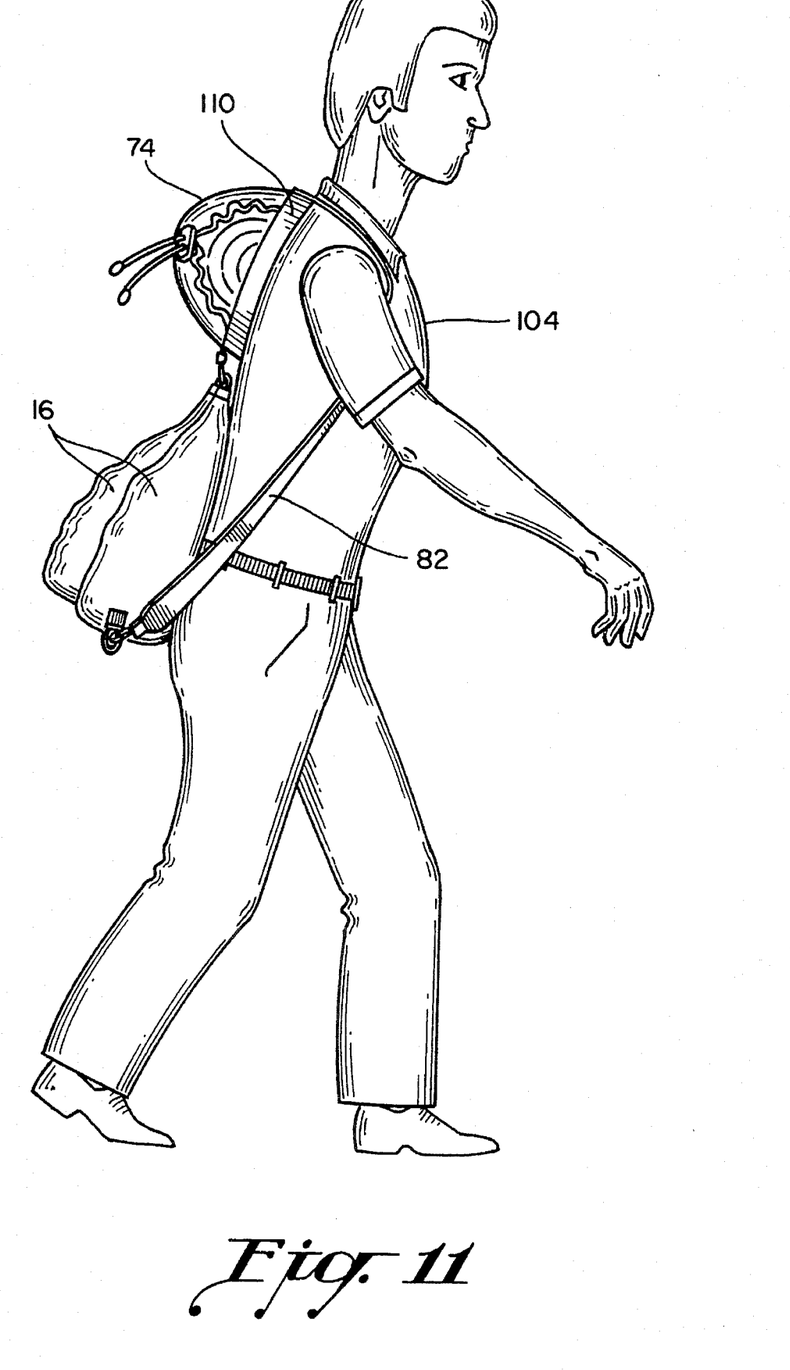
FIG. 11 is a perspective view of an individual wearing the reusable shopping bag assembly with loaded collapsible expandable soft sided bags.

As shown in FIG. 11, the clasp 90 attached to each lower member portion 100 can be inserted through the hanger bars 24 of two separate bags 16 so that two loaded bags can be easily transported by an individual 104. Additionally, when the bags 16 have been removed from within the backpack type bag 74 to be loaded and suspended from the backpack type bag 74 for transport, the inside portion of the back pack type bag 74 can be utilized to carry additional items.

In an alternative quiver style embodiment, a carrying strap similar to the shoulder strap 82 has a first strap end and a second strap end. The first strap end would be attached or sewn to a first end of the quiver 74 at a location similar to where the first end 84 of one of the shoulder straps 82 was attached, as previously described and shown in FIG. 9. The second strap end would be attached or sewn to the quiver 74 at a location similar to where the first end 84 of the opposite shoulder strap 82 was attached.

The quiver or backpack type bag 74 has a tote bag or side pouch 108 connected to an outside surface of the backpack type bag 74. Preferably, the side pouch 108 is attached to the back side 88 of the backpack type bag 74 so that when the backpack type bag 74 is worn by an individual 104, as shown in FIG. 11, the side pouch is towards the individual's back and is thereby protected.

Figure 10:
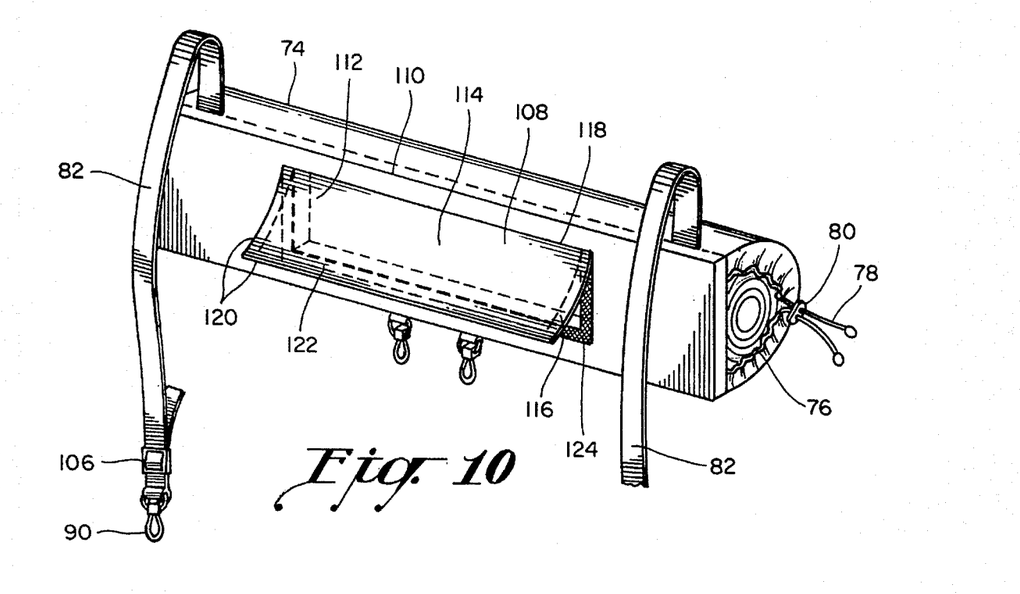
FIG. 10 is a perspective view of the backpack type bag.

Referring now to FIG. 10, back side 88 has a flat pad 110 attached thereto. The flat pad 110 is preferably formed of a foam or padded type material and provides additional comfort when an individual is wearing the backpack type bag 74. In one embodiment, the flat pad 110 has an aperture 112 creating a side pouch compartment 114 The side pouch compartment 114 has an access flap 116. The access flap 116 has a secured side 118 which is attached to the flat pad 110. The access flap has detachably secured side portions 120 having a hook and loop type fastening structure 122 attached thereto, such as VELCRO, which is detachably secured to a mated hook and loop type fastening structure 124 attached to the flat pad 110.

Although the invention has been described by reference to some embodiments it is not intended that the novel device be limited thereby, but that modifications thereof are intended to be included as falling within the broad scope and spirit of the foregoing disclosure, the following claims and the appended drawings.

I claim:

1. A reusable shopping bag structure comprising:
   (a) a collapsible and expandable soft sided bag which can be rolled up from an upper open end in a spiral shape; and
   (b) a pair of elongated hanger bars, the bag having hanger bars means for attaching the hanger bars to opposite sides of said bag adjacent the upper open end of the bag, opposite ends of each hanger bar extending beyond opposite sides of the bag for engagement with spaced apart upper edges of a shopping cart to suspend the bag in a shopping cart when the bag is unrolled and expanded for hanging in a shopping cart, the hanger bars adapted to extend substantially perpendicularly from the upper edges of the shopping cart with each hanger bar having means for slidably, telescopically varying the distance between of the hanger bar to provide a variable length hanger bar for extending between the spaced apart upper edges of shopping carts having varied widths between the spaced apart upper edges.

2. The reusable shopping bag of claim 1, wherein the hanger bars further comprise means for detachably securing each hanger bar to one another.

3. The reusable shopping bag of claim 2, wherein the means for detachably securing each hanger bar to one another comprises a hook and loop type fastening strap connected to one hanger bar for detachably securing to a mated hook and loop type fastening strap connected to the other hanger bar.

4. The reusable shopping bag of claim 2, wherein the means for detachably securing each hanger bar to one another comprises a latch assembly operatively connected to the hanger bars.

5. The reusable shopping bag of claim 1, wherein the collapsible expandable soft sided bag is comprised of a soft woven fabric.

6. The reusable shopping bag of claim 1, wherein the hanger bars each have hooks at opposite ends to suspend the reusable shopping bag on the cart.

7. The reusable shopping bag of claim 1, wherein the means for slidably, telescopically varying the distance between opposite ends of the hanger bar is located at a center portion of the hanger bar.

8. The reusable shopping bag of claim 7, further comprising biasing means for urging the opposite ends inwardly towards the center portion of the hanger bar.

9. The reusable shopping bag of claim 8, wherein the biasing means includes a pair of elastic cords, each cord having a first cord end and a second cord end, each first cord end being operatively connected to a respective opposite end of the hanger bar, and each second cord end being operatively connected to the center portion of the hanger bar.

10. A reusable shopping bag assembly comprising:
   (a) a pair of collapsible and expandable soft sided bags which when in a collapsed stacked state can be rolled up from an upper open end in a spiral shape;
   (b) two pairs of elongated hanger bars, each bag having hanger bars means for attaching a hanger bar to opposite sides of said bag adjacent the upper open end of each bag, each pair of hanger bars having means for detachably securing each hanger bar to one another, opposite ends of each hanger bar extending beyond a respective side of each bag for engagement with spaced apart upper edges of a shopping cart to suspend each bag in a shopping cart when each bag is unrolled and expanded for hanging in a shopping cart;
   (c) a backpack type bag having a side opening, the side opening being adapted for insertion of the bags when the bags are in a rolled up state so that the backpack type bag will encapsulate the bags;
   (d) a pair of shoulder straps, the shoulder straps each having a first end and a second end;
   (e) means for securing the first end of each shoulder strap to the backpack type bag;
   (f) means for detachably securing the second end of each strap to at least one of the bags when the bags are in an unrolled state; and
   (g) means for detachably securing the hanger bars to the backpack type bag when the bags are in an unrolled state so that the bags are suspended from and adjacent to the backpack type bag.

11. The reusable shopping bag assembly of claim 10, wherein the hanger bars further comprise means for adjustably securing the opposite ends of each hanger bar to the spaced apart upper edges of the shopping cart.

12. The reusable shopping bag assembly of claim 10, further comprising a flat pad mounted to an outside surface of the backpack type bag.

13. The reusable shopping bag assembly of claim 12, wherein the flat pad has an aperture creating a side pouch, the side pouch having an access flap, and means for detachably securing the access flap to the side pouch for enclosing the side pouch.

14. A reusable shopping bag structure and a shopping bag holding assembly comprising in combination:
   (a) a collapsible and expandable soft sided bag which can be rolled up from an upper open end in a spiral shape;
   (b) a pair of elongated hanger bars, the bag having hanger bars means for attaching the hanger bars to sides of the bag adjacent the upper open end of the bag, opposite ends of each hanger bar extending beyond opposite sides of the bag for engagement with spaced apart upper edges of a shopping cart to suspend the bag in a shopping cart when the bag is unrolled and expanded for hanging in a shopping cart, the hanger bars adapted to extend substantially perpendicularly from the upper edges of the shopping cart with each hanger bar having means for slidably, telescopically varying the distance between opposite ends of the hanger bar to provide a variable length hanger bar for extending between the upper edges of shopping carts having varied widths between the spaced apart upper edges; and
   (c) a shopping bag holding assembly having means for holding the bag when the bag is in a rolled state.

15. The combination of claim 14, wherein the means for holding the bag comprises a quiver having a side opening, the side opening being adapted for insertion of the collapsible expandable soft sided bag when the collapsible expandable soft sided bag is in a rolled state so that the quiver will encapsulate the collapsible expandable soft sided bag.

16. The combination of claim 15, wherein the side opening of the quiver has a cinching means for closing the side opening.

17. The combination of claim 15, further comprising a side pouch connected to an outside surface of the quiver.

18. The combination of claim 17, wherein the side pouch has an access flap and means for detachably securing the access flap to the side pouch.

19. The combination of claim 14, wherein the means for holding the bag comprises:
   (a) a backpack type bag having a side opening, the side opening being adapted for insertion of the collapsible expandable soft sided bag when the collapsible expandable soft sided bag is in a rolled up state so that the backpack type bag will encapsulate the collapsible expandable soft sided bag;
   (b) a pair of shoulder straps, the shoulder straps each having a first end and a second end;
   (c) means for securing the first end of each shoulder strap to the backpack type bag;
   (d) means for detachably securing the second end of each strap to the collapsible expandable soft sided bag when the collapsible expandable soft sided bag is in an unrolled state; and
   (e) means for detachably securing the hanger bars to the backpack type bag when the collapsible expandable soft sided bag is in an unrolled state so that the collapsible expandable soft sided bag is suspended from and adjacent to the backpack type bag.

20. The combination of claim 19, wherein the side opening of the backpack type bag has a cinching means for closing the side opening.

21. The combination of claim 19, further comprising means for length adjustment of each shoulder strap connected to each shoulder strap.

22. The combination of claim 19, further comprising a side pouch connected to an outside surface of the backpack type bag.

23. The combination of claim 22, wherein the side pouch has an access flap and means for detachably securing the access flap to the side pouch.

24. The combination of claim 19, further comprising a flat pad mounted to an outside surface of the backpack type bag.

25. The combination of claim 24, wherein the flat pad has an aperture creating a side pouch, the side pouch having an access flap, and means for detachably securing the access flap to the side pouch for enclosing the side pouch.

26. A reusable shopping bag structure and backpack type bag comprising in combination:
   (a) a collapsible and expandable soft sided bag which can be rolled up from an upper open end in a spiral shape;
   (b) a pair of elongated hanger bars, the bag having hanger bars means for attaching the hanger bars to opposite sides of said bag adjacent the upper open end of the bag, opposite ends of each hanger bar extending beyond opposite sides of the bag for engagement with spaced apart upper edges of a shopping cart to suspend the bag in a shopping cart when the bag is unrolled and expanded for hanging in a shopping cart, the hanger bars adapted to extend substantially perpendicularly from the upper edges of the shopping cart with each hanger bar having means for varying the distance between opposite ends of the hanger bar to provide a variable length hanger bar for extending between the upper edges of shopping carts having varied widths between the spaced apart upper edges;

(c) a backpack type bag having a side opening, the side opening being adapted for insertion of the collapsible expandable soft sided bag when the collapsible expandable soft sided bag is in a rolled up state so that the backpack type bag will encapsulate the collapsible expandable soft sided bag;

(d) a pair of shoulder straps, the shoulder straps each having a first end and a second end;

(e) means for securing the first end of each shoulder strap to the backpack type bag;

(f) means for detachably securing the second end of each strap to the collapsible expandable soft sided bag when the collapsible expandable soft sided bag is in an unrolled state; and (g) means for detachably securing the hanger bars to the backpack type bag when the collapsible expandable soft sided bag is in an unrolled state so that the collapsible expandable soft sided bag is suspended from and adjacent to the backpack type bag.

* * * * *